US008813197B2

(12) United States Patent
Sabin et al.

(10) Patent No.: US 8,813,197 B2
(45) Date of Patent: Aug. 19, 2014

(54) TECHNIQUES FOR NETWORK PROCESS IDENTITY ENABLEMENT

(75) Inventors: Jason Allen Sabin, Lehi, UT (US); Jeremy Ray Brown, Orem, UT (US); Daniel Robert Timpson, Lehi, UT (US)

(73) Assignee: Novell, Inc., Provo, UT (US)

( * ) Notice: Subject to any disclaimer, the term of this patent is extended or adjusted under 35 U.S.C. 154(b) by 821 days.

(21) Appl. No.: 12/335,354

(22) Filed: Dec. 15, 2008

(65) Prior Publication Data
US 2010/0154037 A1 Jun. 17, 2010

(51) Int. Cl.
*H04L 9/32* (2006.01)
*G06F 15/16* (2006.01)

(52) U.S. Cl.
USPC ............................ 726/5; 726/3; 726/7; 726/8

(58) Field of Classification Search
CPC ...... G06F 21/30; G06F 21/44; H04L 63/0407; H04L 9/32
USPC .................................................. 726/5, 3, 7, 8
See application file for complete search history.

(56) References Cited

U.S. PATENT DOCUMENTS

| 5,857,191 | A | 1/1999 | Blackwell et al. | |
|---|---|---|---|---|
| 6,185,680 | B1 | 2/2001 | Shimbo et al. | |
| 6,229,806 | B1 | 5/2001 | Lockhart et al. | |
| 6,678,270 | B1 | 1/2004 | Garfinkel | |
| 7,023,854 | B2 | 4/2006 | Garfinkel | |
| 7,139,917 | B2* | 11/2006 | Jablon ........................... | 713/183 |
| 7,231,661 | B1* | 6/2007 | Villavicencio et al. ........... | 726/4 |
| 7,372,856 | B2 | 5/2008 | Garg et al. | |
| 7,426,642 | B2* | 9/2008 | Aupperle et al. ............. | 713/185 |
| 7,454,758 | B2 | 11/2008 | Chickering | |
| 7,644,275 | B2* | 1/2010 | Mowers et al. ............... | 713/168 |
| 7,765,585 | B2* | 7/2010 | Chao et al. .................... | 713/183 |
| 7,783,765 | B2* | 8/2010 | Hildebrand et al. .......... | 709/229 |
| 7,945,949 | B2* | 5/2011 | Johnson ........................... | 726/5 |
| 8,006,098 | B2* | 8/2011 | Aupperle et al. ............. | 713/185 |
| 2003/0208695 | A1* | 11/2003 | Soto et al. ..................... | 713/202 |
| 2005/0210293 | A1* | 9/2005 | Ohtani .......................... | 713/201 |
| 2007/0005801 | A1* | 1/2007 | Kumar et al. ................. | 709/238 |
| 2007/0133408 | A1 | 6/2007 | Park et al. | |
| 2008/0022374 | A1* | 1/2008 | Brown et al. ..................... | 726/5 |
| 2008/0196097 | A1* | 8/2008 | Chao et al. ........................ | 726/9 |
| 2009/0150988 | A1* | 6/2009 | Love et al. ...................... | 726/10 |
| 2009/0199276 | A1* | 8/2009 | Schneider ......................... | 726/5 |
| 2009/0320108 | A1* | 12/2009 | Livingston et al. ............... | 726/6 |

OTHER PUBLICATIONS

Daniel Bovet et al. "Understanding the Linux Kernel, Third Edition" © 2005 O'Reilly Media Inc. Excerpt from Chapter 1 (6 pages).*

(Continued)

*Primary Examiner* — Darren B Schwartz
*Assistant Examiner* — Thomas Gyorfi
(74) *Attorney, Agent, or Firm* — Schwegman, Lundberg & Woessner, P.A.

(57) ABSTRACT

Techniques for network process identity enablement are provided. Inter-server communications within a network are intercepted so that unique identity-based information is gathered and recorded before a sending process is permitted to release a communication over the network to a receiving process. Moreover, the receiving process cannot process the communication being sent until identifying information is gathered again and independently validated against the prior recorded information.

24 Claims, 4 Drawing Sheets

(56) References Cited

OTHER PUBLICATIONS

Comer, Douglas. "Internetworking with TCP/IP, vol. I" © 1995 Prentice Hall Inc. Excerpts from Chapter 11 (pp. 28-29, 73-75, 159-177, 221, and 574).*

Manigandan Radhakrishnan et al. "Application Security Support in the Operating System Kernel" © 2006 ACM (11 pages) http://rites.uic.edu/~solworth/radhakrishnan06applicationSupport.pdf.*

C. Neuman et al. "RFC 4120: The Kerberos Network Authenticatiopn Service (V5)" © 2005 The Internet Society (138 pages) http://tools.ietf.org/pdf/rfc4120.*

"The Quick Guide to GUIDs" © 2007 BetterExplained.com [Publication date of Aug. 20, 2007 as verified by the Internet Archive] (6 pages) http://web.archive.org/web/20070820163954/http://betterexplained.com/articles/the-quick-guide-to-guids/.*

P. Leach et al. "RFC 4122: A Universally Unique IDentidier (UUID) URN Namespace" © 2005 The Internet Society (32 pages) http://www.ietf.org/rfc/rfc4122.txt.pdf.*

Mnich, Marc A. "RandomGuid (Spring Web Services 1.5.9 API)" Version 1.2.1 dated Nov. 5, 2002 (3 pages) http://static.springsource.org/spring-ws/sites/1.5/apidocs/org/springframework/ws/soap/addressing/messageid/RandomGuid.html.*

Poutsma, Arjen. RandomGuidMessageIdStrategy (Spring Web Services 1.5.9 API) © 2005-2010 Spring Web Services Framework (3 pages) http://static.springsource.org/spring-ws/sites/1.5/apidocs/org/springframework/ws/soap/addressing/messageid/RandomGuidMessageIdStrategy.html.*

"How to Use the J2EE SOAP Adapter" Version 1.00—Aug. 2006 (© 2006 SAP AG) (21 pages) http://www.sdn.sap.com/irj/scn/go/portal/prtroot/docs/library/uuid/40611dd6-e66e-2910-f383-e80fb44f9cd4?overridelayout=true.*

"Web Service Idempotency and WS-Addressing" Article dated Jun. 5, 2008 as verified by Google (5 pages) http://msdn.microsoft.com/en-us/library/ff650807.aspx.*

Source code for RandomGUID version 1.2.1, dated Nov. 5, 2002 (5 pages) http://www.jarvana.com/jarvana/view/org/springframework/ws/spring-ws/1.5.6/spring-ws-1.5.6-sources.jar!/org/springframework/ws/soap/addressing/messageid/RandomGuid.java.*

* cited by examiner

TECHNIQUES FOR NETWORK PROCESS IDENTITY ENABLEMENT

BACKGROUND

Increasingly communications between services or applications within an enterprise occur via multiple different server machines. That is, application processing has become distributed where communications between multiple machines and even networks has become commonplace and often occurs in manners that are transparent to the users.

In fact, a large portion of existing applications rely on communication with a variety of other servers that exist within an enterprise network. These applications can contact all sorts of different servers. For the most part, these inter-server communications are not authenticated to one another before processing occurs and so these communications are not truly secure.

Enterprises rely on a variety of assumptions to assuage their security concerns that are perspicacious with non authenticated inter-server communications.

Firstly, it is assumed that if someone has penetrated a firewall or secure environment of an enterprise then that the entity, which has penetrated the firewall, was properly authenticated before that entity begins processing applications within the secure environment. In other words, entities are authenticated before they gain access to a secure environment and what those entities can do within that environment is closely monitored and controlled. Secondly, certain applications are restricted from being executed based on policy and security limitations, which can be enforced within the firewall environment by enterprise security systems; so, the assumption is that critical applications are closely monitored within the firewall anyway by the enterprise. Thirdly, the enterprise assumes the only way in which inter-server communication within the firewall can be authenticated is via costly modifications to legacy applications and the expense of doing this outweighs the perceived added security benefit in securing inter-server communications within the firewalled environment.

Thus, what is needed is a mechanism by which legacy network processes or applications can be authenticated without having to modify those legacy network processes.

SUMMARY

In various embodiments, techniques for network process identity enablement are provided. More specifically, and in an embodiment, a method is provided for integrating an identity-based monitoring approach to inter-server communications.

DETAILED DESCRIPTION

Figure 1:
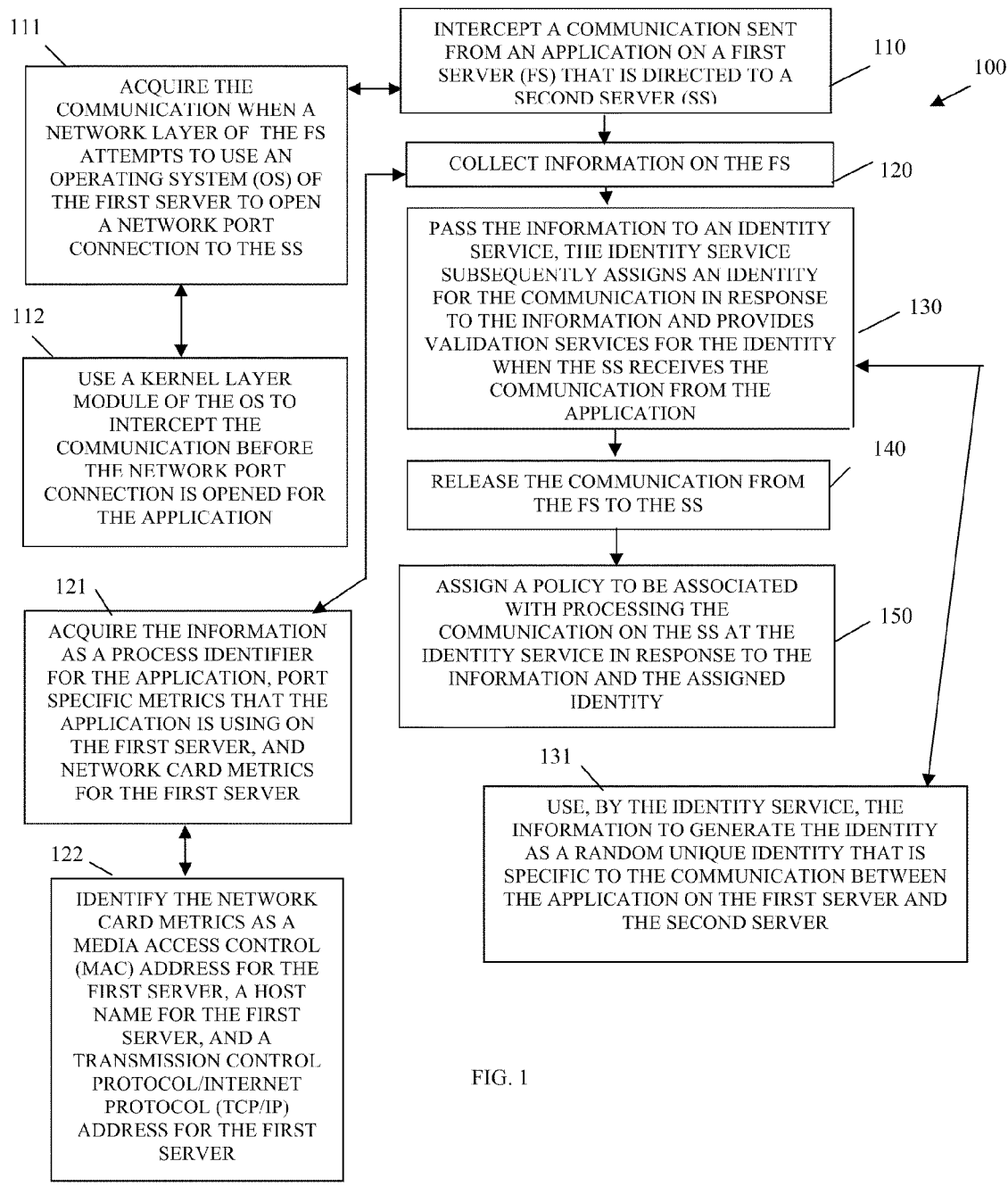
FIG. 1 is a diagram of a method for integrating an identity-based monitoring approach to inter-server communications, according to an example embodiment.

A "resource" includes a user, content, a processing device, a node, a service, an application, a system, a directory, a data store, groups of users, combinations of these things, etc. The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment.

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity services may authenticate and establish trust with one another, viewing one another as a specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

Various embodiments of this invention can be implemented in existing network architectures, security systems, data centers, and/or communication devices. For example, in some embodiments, the techniques presented herein are implemented in whole or in part in the Novell® network, proxy server products, email products, operating system products, data center products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-5.

FIG. 1 is a diagram of a method 100 for integrating an identity-based monitoring approach to inter-server communications, according to an example embodiment. The method 100 (hereinafter "identity integration service") is implemented as instructions in a machine-accessible and computer-readable storage medium. The instructions when executed by a machine (computer, processor, etc.) perform the processing depicted in FIG. 1. The identity integration service is also operational over and processes within a network. The network may be wired, wireless, or a combination of wired and wireless.

The identity integration service provides a processing perspective for an embodiment of the invention from a first server in a client server architecture. An application that executes on the first server attempts to send a communication or network transaction to a second server over the network. The first application is unaware of the identity integration service and believes that it is directly communicating with the second server via the communication or network transaction that it sends. In this manner, the application can be any legacy enterprise application or service that communicates over the network to another second server. This can be any inter-server communication originated by any application or process from a first server.

At 110, the identity integration service intercepts a communication (transaction) sent from an application on a first server. Again, the communication is directed to a second server over the network. Interception of the communication, in a manner that is unknown to the application (legacy application, can be done in a variety of manners.

For example, at 111, the identity integration service acquires the communication when a network layer of the first server attempts to use an operating system (OS) of the first server to open a network port connection to the second server. So, the identity integration service can mask itself from the application at the network communication layer or at a lower level of abstraction handled by the OS.

Continuing with the embodiment at 111 and at 112, the identity integration service uses or operates as a kernel layer module of the OS to intercept the communication before the network port connection is opened for the application to communicate the communication to the second server. This can be done as a shim within the OS kernel that latches to the port connection processing.

At 120, the identity integration service collects information on the first server and the application that is initiating the communication. The purpose of gathering information or metrics is to uniquely identify the communication and the application to essentially assign it a unique verifiable identity that can be authenticated when the second server attempts to process it. In this manner, a bogus or unauthorized communication sent to the second server can be detected and prevented from processing on the second server. A variety of information can be collected.

For example, at 121, the identity integration service collects the information by acquiring the information as a process identifier (PID), port specific metrics that the application is attempting to use on the first server, and/or network card metrics for the first server. The network card metrics can include a variety of details. Essentially, the identity integration service establishes the identity of the first server during this process of collecting the information.

A variety of techniques can be used to establish an identity for the first server when it communicates to the identity service to ensure that the first server is not being spoofed and is legitimate. One such technique that can be used herein and below with various embodiments of the invention is described in U.S. patent application Ser. No. 12/259,382 entitled: "Trusted Platform Module (TPM) Assisted Data Center Management," commonly assigned to Novell Inc., of Provo Utah, and filed on Oct. 28, 2008. Moreover, this approach used to identify the first server for trusted communication can also be used between the identity service and the second server when the second server communicates with identity service.

So, continuing with the embodiment at 121 and at 122, the identity integration service identifies the network card metrics as such things as a media access control (MAC) address for the first server, a host name for the first server, and/or a Transmission Control Protocol/Internet Protocol (TCP/IP) address for the first server.

At 130, the identity integration service passes the information to an identity service. Example identity services that can be modified and enhanced to achieve the teachings presented herein were described in detail above and incorporated by reference herein and above.

The identity service assigns an identity for the communication in response to the information and provides validation services for the identity when the second server receives the communication for the application.

According to an embodiment, at 131, the identity service uses the received information to generate the identity as a random unique identity that is specific to the communication between the application on the first server and the second server.

The identity service can use this identity for a variety of purposes, some of which are discussed in greater detail herein and below.

At 140, the identity integration service releases the communication from the first server to the second server. That is, the application is permitted to directly contact the second server via the first server.

In an embodiment, at 150, the identity integration service assigns a policy to be associated with processing the communication on the second server at the identity service in response to the information and the assigned identity.

It is noted that the servers (first and second) discussed herein cab be physical servers or can be virtualized servers that are carved out of a physical machine and represent a logical machine. So, the actual servers can be physical or virtual.

It is also noted that communication between the first server and the identity service and communication between the second server and the identity service is achieved in a secure manner, such as via Secure Socket Layer (SSL) communication and other secure communication protocols. So, communication is trusted and validated between the first server and the identity service and the second server and the identity service.

Figure 2:
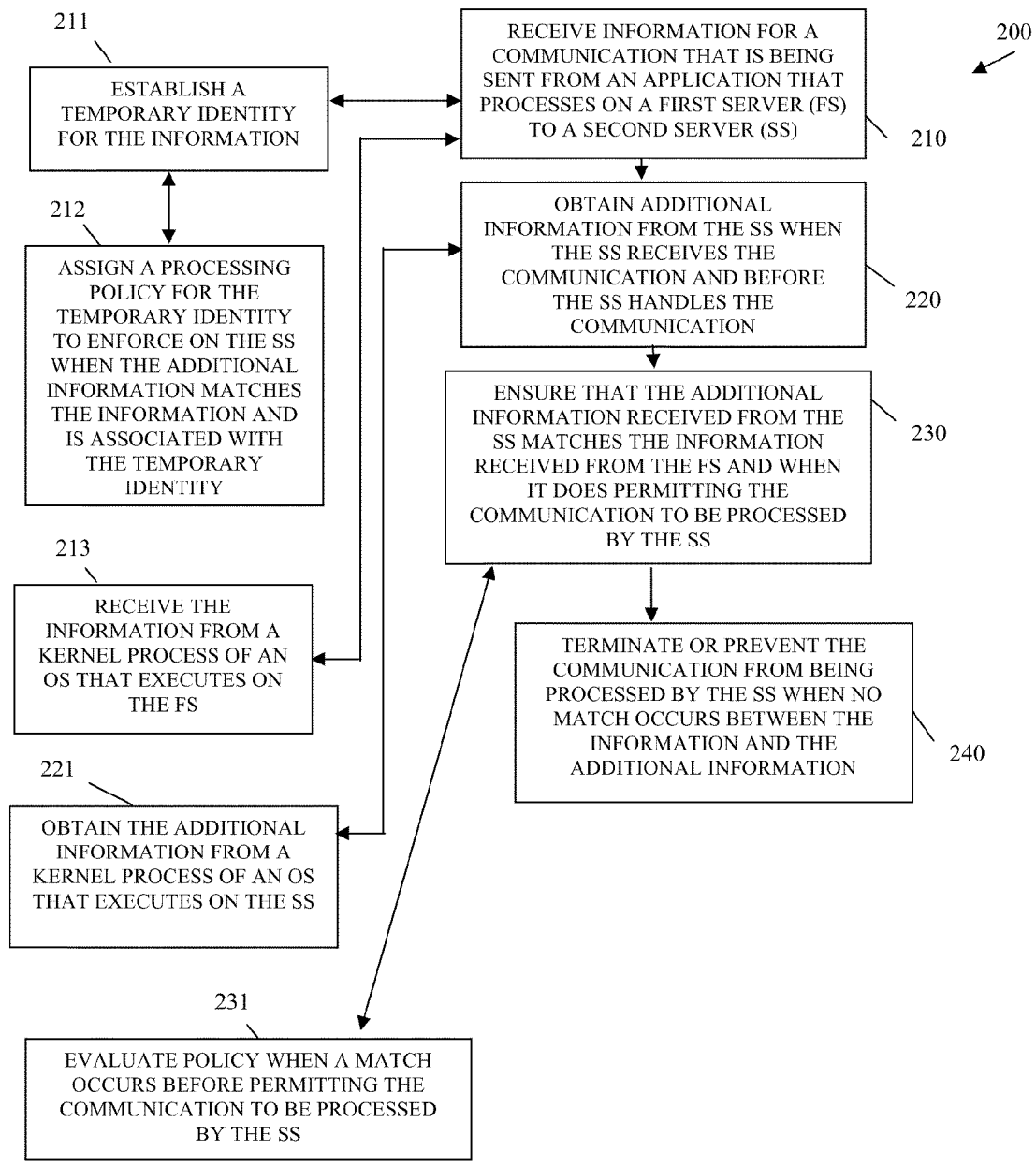
FIG. 2 is a diagram a method for integrating an identity-based monitoring approach to inter-server communications, according to an example embodiment.

FIG. 2 is a diagram a method 200 for integrating an identity-based monitoring approach to inter-server communications, according to an example embodiment. The method 200 (hereinafter "security integration service") is implemented as instructions in a machine-accessible and computer-readable storage medium. The instructions when executed by a machine (computer, processor, etc.) perform the processing depicted in FIG. 2. The security integration service is also operational over and processes within a network. The network may be wired, wireless, or a combination of wired and wireless.

The security integration service presents a processing perspective from that of a modified and enhanced identity service, which was discussed above with reference to the method 100 of the FIG. 1.

At 210, the security integration service receives information for a communication that is being sent from an application that processes on the first server to a second server. This situation was discussed above with reference to the method 100 and the FIG. 1.

According to an embodiment, at 211, the security integration service establishes a temporary identity for the information.

Continuing with the embodiment at 211 and at 212, the security integration service assigns a processing policy for the temporary identity that enforced on the second server when additional information (acquired from the second server and discussed below with reference to 220) matches the information and is associated with the temporary identity.

In an embodiment, at 213, the security integration service receives the information from a kernel process of an OS that executes on the first server. So, the application is unaware of the communication occurring with the security integration service. It is a kernel process on the OS of the first server that intercepts the communication (as was discussed above with reference to the method 100 of the FIG. 1) and provides it to the security integration service.

At 220, the security integration service obtains additional information from the second server when the second server receives communication and before the second server handles the communication. The additional information is directly acquired from the communication and the application when the application communicates directly over the network with the second server from the first server.

According to an embodiment, at 221, the security integration service obtains the additional information from a kernel process of an OS that executes on the second server. Similar to what was discussed above with reference to the processing at 213, the second server and the processes thereon that are to be the recipient of the communication from the application are unaware of the kernel process of the OS on the second server that communicates the additional information to the security integration service.

At 230, the security integration service ensures that the additional information received from the second server matches the information received from the first server. When there is a match, the security integration service permits the communication to be processed by the second server.

In a particular case, at 231, the security integration service evaluates policy when a match occurs before permitting the communication to be processed by the second server. The policy is enforced before the second server is permitted to process the communication. In some cases, the policy, via security services on the second server, can be enforced while the communication is processing on the second server.

In an embodiment, at 240, the security integration service terminates or prevents the communication from being processed by the second server when no matches occur between the information and the additional information. That is, the second server and any process that the communication is being directed to will not be able to process the communication (transaction) when the security integration service cannot validate the additional information supplied by the second server against the information originally supplied by the first server. So, rogue processes are detected and not prevented to process within the network. Inter-server communications are validated, via the security integration service.

Figure 3:
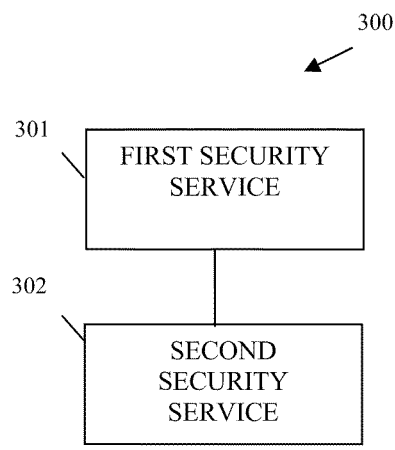
FIG. 3 is a diagram of identity-based server communication system, according to an example embodiment.

FIG. 3 is a diagram of identity-based server communication system 300, according to an example embodiment. The identity-based server communication system 300 is implemented as instructions (within a machine-accessible and computer-readable storage medium) that when executed by a machine (processor, etc.) perform, among other things, the processing discussed above with respect to the methods 100 and 200 of the FIGS. 1 and 2, respectively. Moreover, the identity-based server communication system 300 is operational over a network, and the network may be wired, wireless, or a combination of wired and wireless.

The identity-based server communication system 300 includes a first security service 301 and a second security service 302. Each of these components of the system 300 and their interactions with one another will now be discussed in detail.

The first security service 301 is implemented in a computer-readable storage medium and processes on a first OS of a first server. Example processing of the first security service 301 on the first server was presented above in detail with reference to the method 100 of the FIG. 1.

The first security service 301 intercepts a communication (transaction) being sent from an application that processes on the first server. The communication is being sent by the application to a second server. The first security service 301 is unknown to the application. So, the application can be any legacy service or process that executes on the first server.

The first security service 301 gathers information regarding the application and the first server and then reports that information to an identity service. Example processing associated with a modified and enhanced identity service was presented above with reference to the method 200 of the FIG. 2. The first security service 301 reports the information to the identity service before the communication is released from the first server to the second server.

In an embodiment, the first security service 301 gathers the information as a TCP/IP address for the first server, a port number for a port that the first application uses on the first server, a PID for the first application, and/or network interface controller data for the first server.

In a particular implementation, the first security service 301 is implemented as a kernel process of the first operating system on the first server.

The second security service 302 is implemented in a computer-readable storage medium and processes on a second operating system of a second server. Some example aspects of the second security service 302 were presented above with reference to the method 200 of the FIG. 2.

The second security service 302 intercepts the communication when it is released from the first server to the second server and before the communication is capable of being processed on the second server by the service or application that the communication was directed to on the second server.

The second security service 302 gathers additional information regarding the application and the first server for the communication and provides that additional information to the identity service.

Furthermore, the second security service 302 releases the communication for processing on the second server when the identity service provides authorization indicating that the information originally supplied by the first security service 301 matches the additional information supplied by the second security service 302.

According to an embodiment, the second security service 302 acquires the additional information via metadata received with the communication from the second server. The metadata includes such information as a TCP/IP address for the first server, a port number for a port that the first application uses on the first server, a PID for the first application, and/or network interface controller data for the first server.

In a particular implementation, the second security service 302 is implemented as a kernel process within the second operating system of the second server. So, similar to the first security service 301, the second security service 302 is unknown and undetected by an application or service on the second server that the communication was directed to.

In an embodiment, the identity service supplies a policy to the second security service 302 for the second security service 302 to enforce against the communication when it is processed on the second server.

Figure 4:
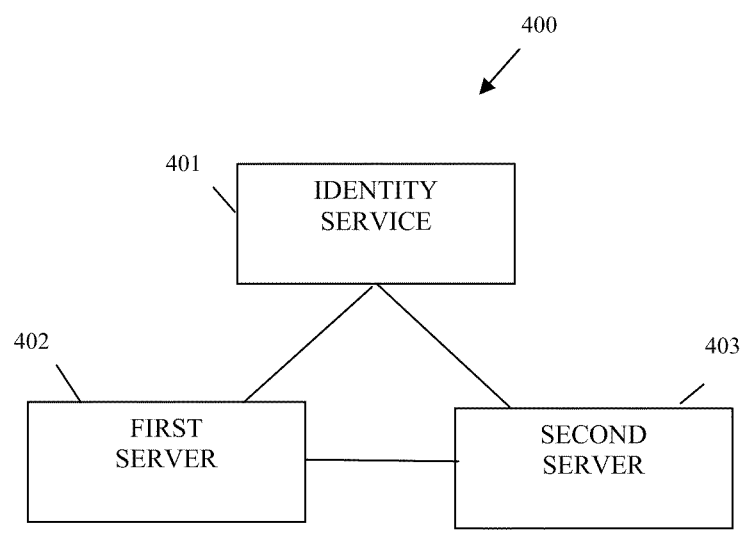
FIG. 4 is a diagram of another identity-based server communication system, according to an example embodiment.

FIG. 4 is a diagram of another identity-based server communication system 400, according to an example embodiment. The identity-based server communication system 400 is implemented as instructions on or within a machine-accessible and computer-readable storage medium. The instructions when executed by a machine (processor, computer, etc.) perform processing depicted with respect to the methods 100 and 200 of the FIGS. 1-2, respectively. The identity-based server communication system 400 is also operational over a network and the network may be wired, wireless, or a combination of wired and wireless.

The identity-based server communication system 400 presents a different perspective and in some cases enhanced perspective of the identity-based server communication system 300 discussed above with reference to the FIG. 3.

The identity-based server communication system 400 includes an identity service 401, a first server 402, and a second server 403. Each of these and their interactions with one another will now be discussed in detail.

The identity service 401 is implemented in a computer-readable storage medium and is executed by one or more processors of the network. Example processing associated with the identity service 401 was presented in detail above with reference to the method 200 of the FIG. 2.

During operation of the system 400, a first application (any legacy process that executes on the first server 402) attempts to send a communication (network transaction) to the second server 403 (inter-server communication within the network). This communication is sent by the first application from the first server 402 to the second server 403.

Before the communication is sent to the second server 403 from the first server 402, information is gathered about and for the first application and the first server 402. This information is provided to the identity service 401 for purposes of uniquely identify the communication. Once the information is reported to the identity service 401, the communication is released to the network layer and OS on the first server 402 and sent to the second server 403 for processing.

When the second server 403 receives the communication, additional information is independently gathered from the second server 403 about and regarding the communication. This additional information is sent to the identity service 401.

The identity service 401 validates the communication by comparing the information against the additional information and authorizes the second sever to process the communication when there is a match.

So, there is no inter-server communication that occurs within the network without first passing through in some fashion, the identity service 401. This ensures that each transaction and inter-server transaction is validated based on identity.

In an embodiment, a first kernel process of a first OS on the first server 402 intercepts the communication that is being sent from the first application before it is released to the second server 403. The first kernel process gathers the information and sends it to the identity service 401 on behalf of the first application. The first application is completely unaware of the processing that takes place on its behalf to ensure subsequent validation of the communication.

Similarly, a second kernel process of a second OS on the second server 403 intercepts the communication on the second server 403 before the second server 403 processes the communication and gathers the additional information about the communication. This additional information is sent from the second kernel process to the identity service 401.

According to an embodiment, the identity service 401 supplies a policy to the second server 403 to enforce on the second server 403 when the communication is processed on the second server 403. The policy is identified by the identity service 401 in response to matching the information received from the first server 402 against the subsequent additional information received from the second server 403.

Figure 5:
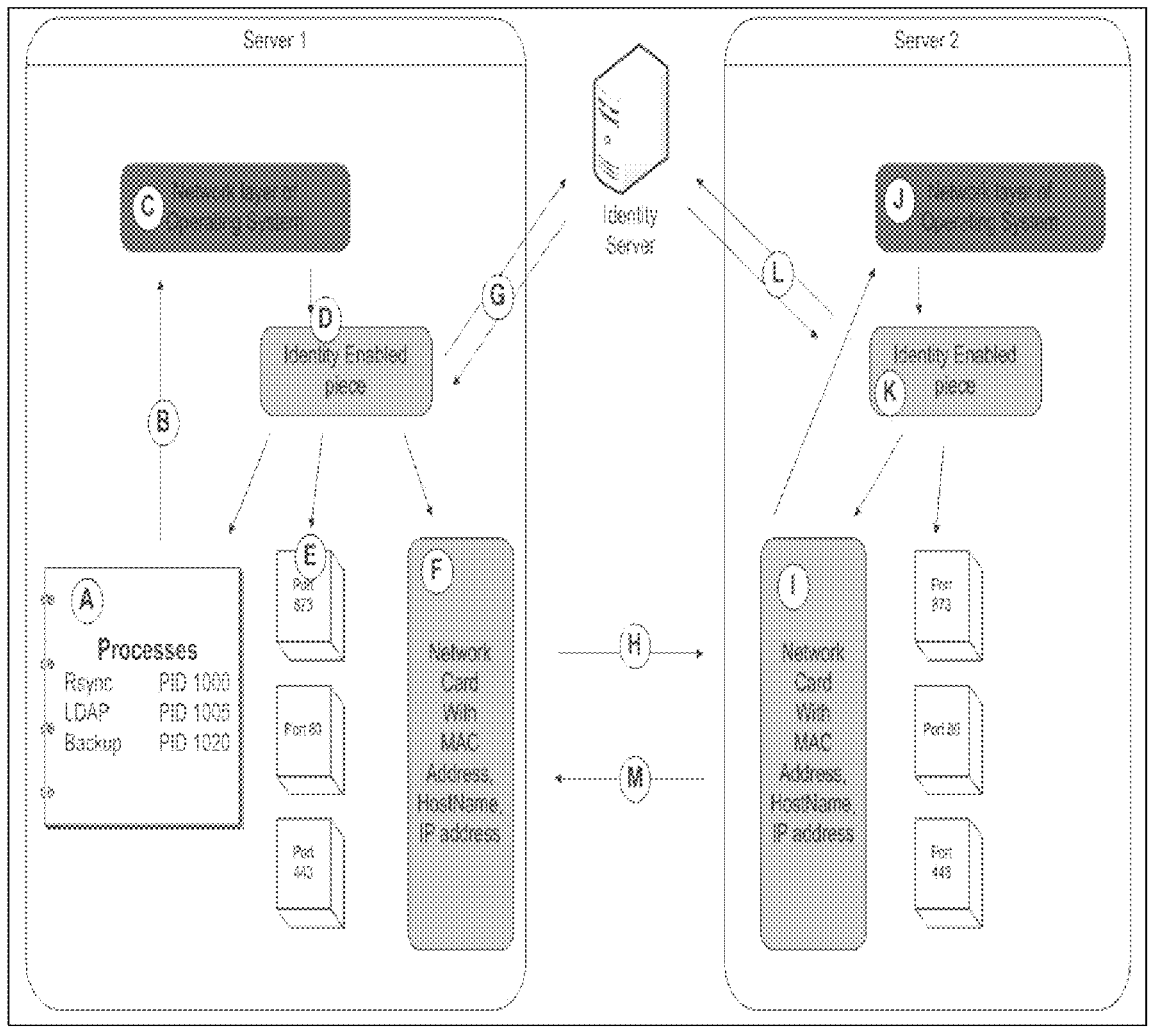
FIG. 5 is an example architecture for the identity-based inter-server communication techniques presented herein, according to an example embodiment.

FIG. 5 is an example architecture for the identity-based inter-server communication techniques presented herein, according to an example embodiment. Components of the architecture are implemented in a computer-readable storage medium as instructions that are executed by one or more processors of a network. The network may be wired, wireless, or a combination of wired and wireless.

It is noted that the architecture is presented for purposes of illustration only and other implementations and approaches are foreseeable without departing from the beneficial and novel teachings discussed herein.

Starting with (item A) a process on a local Server 1 determines it needs to perform some type of network communication with Server 2. This can be via any type of network communication. The process contacts the Network layer of the Operating System (OS) (Item B) for making a request to open a new network port for communication. The Network Layer then opens a source port, but it can go through some type of Identity Enablement authentication mechanism on the OS (Item D).

This Identity enabled piece can be a loaded kernel module, a network driver, or any other type of shim that hooks into the network OS. This can be solved in a number of different ways and is just a shim piece that all network processes have to go through. This can be implemented in a variety of ways that depend on the OS being supported.

The identity enabled shim then collects some information about the server. It also collects Process information (like a Process Identifier (PID)) from Item A, Port specific data (Item E), and Network Card data (Item F). The Network Card data is specific data that can be used to verify and determine which server this is. This can include a Media Access Control (MAC) Address, Host-Name, and Transfer Control Protocol/Internet Protocol (TCP/IP) address, which can be used to uniquely identify this specific server. The Port information is used to uniquely identify which network communication on which port. The Process information is used to uniquely identity which process is associated with the port, Network Interface Controller (NIC), Internet Protocol (IP) address and other data. With all of this data, the information is passed to the Identity Server (e.g., Identity Service) listed in item G. The Identity Server, in an embodiment, then assigns a random unique identity to the combination of data including PID, Port, and server Data (MAC, Hostname, IP address). This randomly generated identity is used for just this specific network communication.

The Identity Server (Item G) can also perform any type of policy based decision at this point in time to determine if this particular network process should be allowed to be performed or not at this time.

If this network process is allowed for this process on this port, then the Identity Enabled Piece allows the network communication to occur (Item H).

Server 2 then receives this network communication at Item I. Network communication occurs on this server with a specific NIC, which has a specific MAC, Hostname, and IP address. The NIC then passes this to the OS.

But this Server also has the Identity Enablement Piece that was discussed in Item D on Server 1. This Identity Enablement Piece is again a shim into the OS, which can be solved with by a number of ways. This was also listed at Item K, above.

The Identity Enablement code collects the information of the network communication it has received from Server 1 and its own network information including MAC address, Host-Name, IP address, and port it was sent to. This information is collected and sent to the Identity Server via communication item L.

The Identity Server then determines if this is a valid communication and verifies that it is the same network communication that was sent previously in item G. It looks up the network port, MAC, IP address, and determines what Process is attempting to contact this server from the previous communication from Server 1 that occurred at Item G.

If this is a valid network process it then follows any policy decisions that are to be made. It also determines via policy configuration if this is a valid process communication that is authorized to occur in the first instance.

Once the identity is validated and policy has been allowed, the identity Server talks to the Identity Enablement (Item K) and tells it whether this particular inter-server communication is valid or not.

If the network process and communication is valid it will finally pass this onto the actual OS where the server 2's process can handle the data.

The techniques presented herein tie a unique identity to each network communication that occurs between 2 or more servers. The identity is tied together and uniquely identified by a variety of information, such as originating Server ID, PID, Port, MAC, Hostname, and IP Address with a destination Server Port, MAC, Hostname, and IP Address. This can be integrated with every server in an enterprise data center. Additionally, by having the Identity Enabled piece that can be loaded on every server, legacy network communication on each server for each network process can have identity tied to it. Once Identity is tied to inter-server communications, customized policy decisions can be performed in an automated fashion. Note that this integration occurs with no changes to legacy network processes being required. So, enterprise security is enforced against legacy applications that are not modified.

A variety of technical advantages can be achieved with the teachings described herein, such as: (1) providing the ability to apply identity to any type of network communication, especially legacy network communication that does not understand any of the present day identity solutions (e.g., Security Assertion Markup Language (SAML), Liberty Alliance (Liberty), Web Services (WS) Federation, etc.); (2) identifying network communication based upon PID, Source Port, Destination Port, and Server information; (3) having each network communication or transaction go through an identity-enabled processing mechanism similar to how an Hyper Text Transfer Protocol (HTTP) proxy works; and (4) tying identity to each data packet transmitted within a network.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A computer-implemented method that is adapted to executed by a processor to perform the method, comprising:
   intercepting a communication sent from an application on a first server that is directed to a second server, the application is a legacy application not enabled with identity processing and the application unaware of interaction occurring with an identity service and the legacy application lacks the ability to communicate over a network using network communication associated with the identity processing;
   collecting information as metrics on the first server to uniquely identify the communication and the application and to assign a unique identity;
   passing the information to an identity service, wherein the identity service subsequently assigns the unique identity for the communication using the information collected and provides validation services for the identity when the second server receives the communication from the application and before the second server processes the communication, and the identity is a unique verifiable identity specific to the communication based on the information collected; and releasing the communication from the first server to the second server.

2. The method of claim 1, wherein intercepting further includes acquiring the communication when a network layer of the first server attempts to use an operating system (OS) of the first server to open a network port connection to the second server.

3. The method of claim 2, wherein acquiring further includes using a kernel layer module of the OS to intercept the communication before the network port connection is opened for the application.

4. The method of claim 1, wherein collecting the information further includes acquiring the information as a process identifier for the application, port specific metrics that the application is using on the first server, and network card metrics for the first server.

5. The method of claim 4, wherein acquiring further includes identifying the network card metrics as a media access control (MAC) address for the first server, a host name for the first server, and a Transmission Control Protocol/Internet Protocol (TCP/IP) address for the first server.

6. The method of claim 1, wherein passing further includes using, by the identity service, the information to generate the identity as a random unique identity that is specific to the communication between the application on the first server and the second server.

7. The method of claim 1 further comprising, assigning a policy to be associated with processing the communication on the second server at the identity service in response to the information and the assigned identity.

8. A computer-implemented method that is adapted to executed by a processor to perform the method, comprising:
    receiving information for a communication that is being sent from an application that processes on a first server to a second server, the application is a legacy application that is not enabled with identity processing and the application is unaware of interaction with the method processing and the legacy application lacks the ability to communicate over a network using network communication associated with the identity processing;
    obtaining additional information from the second server when the second server receives the communication and before the second server handles the communication; and
    ensuring that the additional information received from the second server matches the information received from the first server and when it does permitting the communication to be processed by the second server,
        wherein the information and the additional information are specific to the communication;
        wherein the information and the additional information are used to form a unique verifiable identity for the communication;
        wherein the information and the additional information are metrics for the communication and the information to uniquely identify both the communication and the application, and also to assign a unique verifiable identity.

9. The method of claim 8, wherein receiving further includes establishing a temporary identity for the information.

10. The method of claim 9, wherein establishing further includes assigning a processing policy for the temporary identity to enforce on the second server when the additional information matches the information and is associated with the temporary identity.

11. The method of claim 8, wherein receiving further includes receiving the information from a kernel process of an operating system (OS) that executes on the first server.

12. The method of claim 8, wherein obtaining further includes obtaining the additional information from a kernel process of an operating system (OS) that executes on the second server.

13. The method of claim 8, wherein ensuring further includes evaluating policy when a match occurs before permitting the communication to be processed by the second server.

14. The method of claim 8, wherein ensuring further includes terminating or preventing the communication from being processed by the second server when no match occurs between the information and the additional information.

15. A machine-implemented system adapted to be executed on one or more processors, comprising:
    a first security service implemented in a computer-readable storage medium and that processes on a first operating system of a first server;
    a second security service implemented in a computer-readable storage medium and that processes on a second operating system of a second server;
    wherein the first security service intercepts a communication being sent from an application that processes on the first server, the application is a legacy application not enabled with identity processing and the application is unaware of the processing associated with the first security service, and the legacy application lacks the ability to communicate over a network using network communication associated with the identity processing, and the communication being sent by the application to the second server, the first security service gathers information as metrics regarding the application and first server and reports that information to an identity service before the communication is released to the second server, and
    wherein the second security service intercepts the communication released to the second server before the communication is processed and gathers additional information as other metrics regarding the application and the first server for that communication, the second security service provides the additional information to the identity service and releases the communication for processing by the second server when the identity service provides authorization,
        wherein the information and the additional information are specific to the communication,
        wherein the information and the additional information are used to form a unique verifiable identity for the communication, to uniquely identify the communication and the application, and to assign the unique verifiable identity.

16. The system of claim 15, wherein the first security service gathers the information as a Transmission Control Protocol/Internet Protocol address for the first server, a port number for a port that the first application uses on the first server, a process identifier for the first application, and network interface controller data for the first server.

17. The system of claim 15, wherein the second security service acquires the additional information via metadata received with the communication from the second server, and wherein the metadata includes a Transmission Control Protocol/Internet Protocol address for the first server, a port number for a port that the first application uses on the first server, a process identifier for the first application, and network interface controller data for the first server.

18. The system of claim 15, wherein the first security service is a kernel process of the first operating system.

19. The system of claim 15, wherein the second security service is a kernel process of the second operating system.

20. The system of claim 19, wherein the identity service supplies policy to the second security service for the second security service to enforce against the communication when it is processed on the second server.

21. A machine-implemented system adapted to be executed by one or more processors, comprising:
   an identity service implemented in a computer-readable storage medium and processed by a processor of a network;
   a first server processing on the network; and
   a second server processing on the network;
   wherein when a first application attempts to send a communication to the second server from the first server, the first application is a legacy application that is not enabled for identity processing and the first application is unaware of interaction occurring with the identity service, and the legacy application lacks the ability to communicate over the network using network communication associated with the identity processing, and information regarding the first application and the first server is gathered as metrics and provided to the identity service to uniquely identify the communication before releasing the communication to the second server, and
   wherein when the second server receives the communication, additional information is gathered as other metrics for the communication and sent to the identity service, and the identity service validates the communication by comparing the information against the additional information and authorizes the second server to process the communication when there is a match,
   wherein the information and the additional information are used to form a unique verifiable identity for the communication, to uniquely identify the communication and the first application, and to assign a unique verifiable identity.

22. The system of claim 21, wherein a first kernel process of a first operating system on the first server intercepts the communication sent from the first application before it is released to the second server and gathers the information that is sent to the identity service.

23. The system of claim 22, wherein a second kernel process of a second operating system on the second server intercepts the communication before the second server processes the communication and gathers the additional information that is sent to the identity service.

24. The system of claim 21, wherein the identity service supplies policy to the second server to enforce on the second server when the communication is processed on the second server, and wherein the policy is identified in response to the match and additional information.

* * * * *

UNITED STATES PATENT AND TRADEMARK OFFICE
CERTIFICATE OF CORRECTION

| | |
|---|---|
| PATENT NO. | : 8,813,197 B2 |
| APPLICATION NO. | : 12/335354 |
| DATED | : August 19, 2014 |
| INVENTOR(S) | : Sabin et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this
Fourth Day of August, 2015

Michelle K. Lee
*Director of the United States Patent and Trademark Office*